April 7, 1931. J. H. JACOBS 1,799,906
PRESSURE COOKER
Filed March 21, 1930
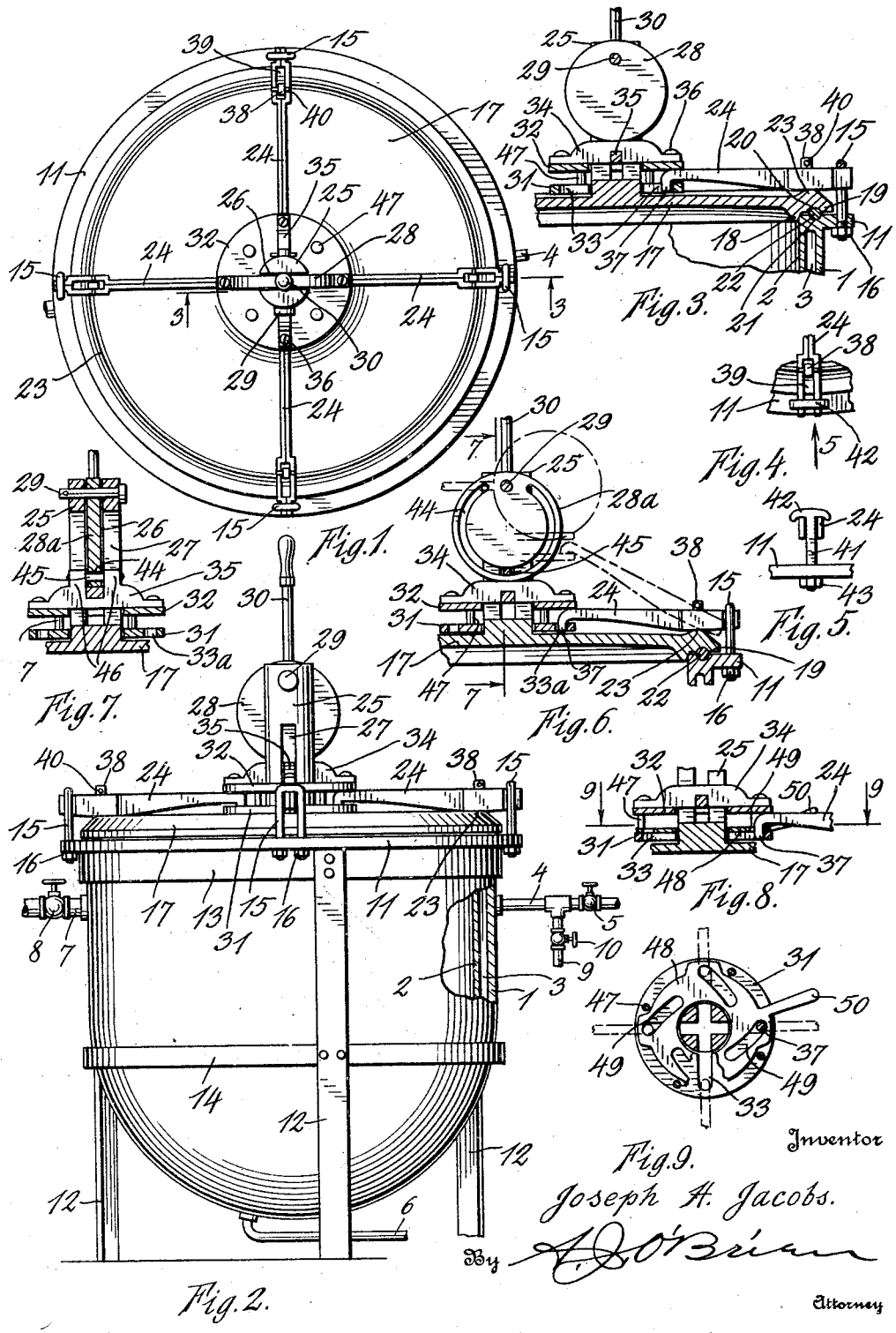
Inventor
Joseph H. Jacobs.
By A. O'Brien
Attorney Patented Apr. 7, 1931

1,799,906

UNITED STATES PATENT OFFICE

JOSEPH H. JACOBS, OF ROCHESTER, NEW YORK

PRESSURE COOKER

Application filed March 21, 1930. Serial No. 437,803.

This invention relates to improvements in pressure cookers of the type employed in packing plants and in hotels for cooking food stuffs.

It is now customary to employ steam for the purpose of cooking and it is the object of this invention to produce a pressure cooker of such construction that it can be heated by means of high pressure steam and which shall be provided with a removable cover that is held in place by a locking device which forms the subject matter of this invention.

In order to explain this invention so that it can be readily understood reference will be had to the accompanying drawing in which it has been illustrated in its preferred form and in which:

Fig. 1 is a top plan view of my improved pressure cooker;

Fig. 2 is a side elevation thereof, with portions broken away to better show the construction;

Fig. 3 is a section taken on line 3—3, Fig. 1;

Fig. 4 is a plan view of a portion of the cover and upper end of the cooker showing a slightly modified form of locking means;

Fig. 5 is an end elevation looking in the direction of arrow 5 in Fig. 4;

Fig. 6 is a section similar to that shown in Fig. 3 but showing a slightly modified form of construction;

Fig. 7 is a section taken on line 7—7, Fig. 6;

Fig. 8 is a section similar to that shown in Fig. 6 and shows the slightly modified form of construction; and Fig 9 is a section taken on line 9—9, Fig. 8.

In the drawing numeral 1 represents the outer wall of the pot and numeral 2 the inner wall thereof. The two walls are separated by a space 3 which is adapted to contain live steam and which is connected to a boiler by means of a pipe 4. The supply of steam is controlled by valve 5. A drain pipe 6 is connected with the bottom of space 3 and serves to remove the condensed steam and other liquids from the chamber. A pipe 7 is connected with a source of cold water and is provided with a valve 8 which controls the flow of water into chamber 3. Pipe 9 and valve 10 serve to empty the space of steam after valve 5 has been closed. After the cooking operation has been finished the steam is turned off and valve 8 opened whereby the steam contained in chamber 3 is quickly condensed and if cold water is permitted to flow through the chamber and thence through pipe 9 for some time, the contents of the cooker will be cooled to such an extent that when the cover is removed there will be no loss due to escaping steam. Another advantage derived from cooling the contents below the boiling point by means of water passing through the chamber 3 is that by so doing the cover can be removed much sooner than would be possible if no special means were provided for cooling the contents, and in this manner a large saving of time is effected.

The pot is provided with an outwardly extending flange 11 and is supported by a frame consisting of a plurality of vertical supports or legs 12 that are connected at their upper ends by means of ring 13 and at points intermediate their ends by means of a ring 14 in the manner shown in Fig. 2. The flange 11 is provided with openings through which the two arms of U-bolts 15 extend. The lower ends of bolts 15 are provided with nuts 16 located on the lower side of flange 11. A cover 17 serves to close the open end of the pot and this cover is provided on its under surface with a circular flange 18 that extends into the open end of the pot in the manner shown in Fig. 3. The cover is also provided with a flat annular surface 19 that extends over the upper surface of flange 11 and this surface is provided with a semicircular groove 20 that is concentric with a similar groove 21 in the upper surface of flange 11 and these two grooves receive a packing ring 22 that forms a seal. The upper surface of the cover is substantially flat and is provided about its outer edge with a ridge 23 that serves as a fulcrum for the locking arms 24. In the drawing four arms have been shown, but in actual practice eight or a greater number of arms are employed. For the purpose of illustration, it was not deemed necessary to show more than four locking arms, but it is understood that the invention is not limited to any specific number of locking arms. The cover is provided with a vertically extending post 25 at its center and this post has a diametrical slot 26 that extends downwardly from the upper end thereof. It is also provided with a slot 27 that extends at right angles to slot 26 in the manner shown in Fig. 7. A cam 28 is located in slot 26 and mounted for movement about the pivot 29. This cam is provided with a handle 30 by means of which it can be rotated. Surrounding the post 25 are two washers 31 and 32. Washer 31 is located underneath washer 32 and is provided with radial slots 33, there being one slot for each arm 24. Located above the washer 32 are two bars 34 and 35, which extend respectively through slots 26 and 27. These bars are notched at their center points in the manner shown in Fig. 3 so that their under surfaces lie in the plane of the upper surface of washer 32. Bar 34 is preferably secured to washer 32 by means of screws 36. The inner ends of arms 24 are provided with downwardly extending lugs 37 that project into the radial openings 33 and are located between washers 31 and 32 in the manner shown in Fig. 3. Extending upwardly from the fulcrum 23 are pins 38 that serve as guides for the arms 24. These arms are preferably made of two pieces of metal secured together by rivets or in any other way and are provided with elongated openings 39 near their outer ends. Each arm is arranged so that a pin 38 extends through the opening 39 and is held against removal by means of a cotter pin 40 or in some other equivalent way. When the cover is in place, the outer ends of arms 24 project through the openings in the U-bolts 15 and when cam 28 is rotated into the position shown in Fig. 3, it forces the inner ends of the arms downwardly whereby the outer ends move upwardly into contact with the U-bolts and this in turn forces the cover against the packing ring 22, thereby forming a steam tight seal. When the cover is to be released the cam is rotated about its pivot, thereby releasing the pressure from the inner ends of the arms, after which the latter are moved radially inward until their outer ends become disengaged from the U-bolts after which the cover can be removed. Slots 33 are purposely made elongated so as to permit this inward movement.

In Figs. 4 and 5 a slightly modified form of construction has been shown. In this embodiment the U-bolts 15 have been replaced by bolts 41 whose heads are formed by transverse bars 42 in the manner shown in Fig. 5. These bolts are preferably square where they extend through the flange 11 and are provided with nuts 43 for the purpose of adjustment. When this construction is employed, the arms are made in a slightly different manner, the difference consisting in this, that slots 39 extend to the end of the arms so that they can be moved outwardly into engagement with bolts 41 in the manner shown in the drawing.

In Figs. 6 and 7 I have shown a slightly modified form of construction and this modification consists in this, that the cam 28a which corresponds to cam 28 is provided with a groove or slot 44 through which a pin 45 extends. This pin also extends through openings in the upwardly extending lugs 46 of the transverse bar 35 in the manner shown in Fig. 7. Washers 31 and 32 are connected by means of screws 47 and washer 31 instead of having long radial slots like those indicated by reference numeral 33 may have round holes 33a. Arms 24 are constructed in the manner already described and have their downwardly extending ends 37 located in the holes 33. Due to the interconnection between cam 28a and the bar 35, the cam will raise the assembly consisting of bars 34, 35 and washers 31 and 32 from the full line to the dotted line position shown in Fig. 6. As the parts move upwardly towards dotted line position arms 24 are tilted and their ends are moved inwardly and the parts are so adjusted that when the dotted line position is reached, the cover can be lifted from the pot in a manner quite obvious.

In Figs. 8 and 9 I have shown a slightly modified form of means for releasing the cover. In this construction washer 31 is provided with elongated slots as shown in Fig. 3 and the parts are otherwise arranged in the same manner as explained in connection with Fig. 3. In addition to the parts employed in the embodiment explained in connection with Fig. 3 I have added a disk or washer 48 that is rotatably mounted on the post 25 and which is provided with spiral slots 49 through which the end portions 37 of the arms extend. Disk 48 is provided with a handle 50 by which it can be rotated and when pressure is removed from the arms 24, disk 48 can be rotated from the position shown in full lines in Fig. 9 in a counter-clockwise direction and this rotation will move the arms inwardly, thereby moving their ends out of engagement with the U-shaped anchoring devices. After the cover has been put in place, disk 48 is turned back to the position shown in Fig. 9 whereby the arms are moved outwardly into engagement with the anchoring devices.

From the above description it will be apparent that I have produced a very simple and locking device for pressure cookers of the type described. By means of my improved locking device the cover can be very quickly applied and locked in poistion and can also be readily removed, owing to the fact that the anchoring devices 15 and 41 are adjustable, the action of the arms can be independently adjusted so as to get a uniform pressure about the circumference of the cover.

The method described by me of having the steam jacket space filled with cold water after the cooking operation has been finished greatly accelerates the operation because unless this is done, the cover cannot be removed until the pressure has been reduced and when this is accomplished by opening the space within the cooker to the atmosphere, the steam that escapes carries with it a large amount of flavor and also valuable food values.

Having described the invention what is claimed as new is:

1. In a device of the class described, in combination, a pot having one end provided with a flange, a cover for closing the open end of the pot, a plurality of anchoring devices secured to the flange, the cover having a post extending vertically from the center thereof, a plate surrounding the post, said plate having a plurality of openings, a plurality of arms having their inner ends provided with lugs that extend into the openings, means for pivotally and slidably connecting the arms to the cover near the outer edge of the latter, and means associated with the post for moving the inner ends of the arms downwardly.

2. In a device of the class described, in combination, a pot having one end provided with a flange, a cover for closing the open end of the pot, a plurality of anchoring devices secured to the flange, the cover having a post extending vertically from the center thereof, a plate surrounding the post, said plate having a plurality of openings, a plurality of arms having their inner ends provided with lugs that extend into the openings, means for pivotally and slidably connecting the arms to the cover near the outer edge of the latter, a washer surrounding the post and resting on the inner ends of the arms, and means carried by the post for forcing the washer downwardly against the arms.

3. In a device of the class described, in combination, a pot open at its top, said pot having an outwardly extending flange, anchoring devices secured to the flange and extending upwardly therefrom, means for adjusting the anchoring devices with respect to the flange, a cover having its outer edge extending over the flange, a post extending upwardly from the center of the cover, said post having a diametrical slot, a cam located in the slot, two spaced washers carried by the post, one of said washers having an opening corresponding to each anchoring device, an arm for each opening and anchoring device, said arms having their inner ends provided with lugs that extend into the openings in the washer and guide pins secured to the outer edge of the cover, each arm having a slot adapted to receive a guide pin.

4. In a device of the class described, in combination, a pot open at its top, said pot having an outwardly extending flange, anchoring devices secured to the flange and extending upwardly therefrom, means for adjusting the anchoring devices with respect to the flange, a cover having its outer edge extending over the flange, a post extending upwardly from the center of the cover, said post having a diametrical slot, a cam located in the slot, two spaced washers carried by the post, one of said washers having an opening corresponding to each anchoring device, an arm for each opening and anchoring device, said arms having their inner ends provided with lugs that extend into the openings in the washer, guide pins secured to the outer edge of the cover, each arm having a slot adapted to receive a guide pin and means for interconnecting the cam and the washers whereby the former will raise the latter when rotated in one direction.

5. In a device of the class described, in combination, a pot open at its top, said pot having an outwardly extending flange, anchoring devices secured to the flange and extending upwardly therefrom, means for adjusting the anchoring devices with respect to the flange, a cover having its outer edge extending over the flange, a post extending upwardly from the center of the cover, said post having a diametrical slot, a cam located in the slot, two spaced washers carried by the post, one of said washers having an opening corresponding to each anchoring device, an arm for each opening and anchoring device, said arms having their inner ends provided with lugs that extend into the openings in the washer, guide pins secured to the outer edge of the cover, each arm having a slot adopted to receive a guide pin and means for simultaneously moving the arms inwardly when the washers are moved upwardly.

6. In a device of the class described, in combination, a pot open at its top, said pot having an outwardly extending flange, anchoring devices secured to the flange, and extending upwardly therefrom, means for adjusting the anchoring devices with respect to the flange, a cover having its outer edge extending over the flange, a post extending upwardly from the center of the cover, said post having a diametrical slot, a cam located in the slot, two spaced washers carried by the post, one of said washers having an opening corresponding to each anchoring device, an arm for each opening and anchoring device, said arms having their inner ends provided with lugs that extend into the openings in the washer, guide pins secured to the outer edge of the cover, each arm having a slot adapted to receive a guide pin and means for simultaneously moving the arms inwardly when the washers are moved upwardly, said last named means comprising a plate rotatably secured to the post and provided with a spiral slot for each arm and a handle for rotating the plate.

7. In a fireless cooker having a flange extending outwardly therefrom and provided with a plurality of upwardly extending anchoring devices, a cover having its upper surface provided with a circular ridge that is adapted to serve as a fulcrum, a plurality of guide pins arranged about the outer edge of the cover, an arm associated with each pin, each of the arms having an elongated slot for the reception, of a guide pin, the cover having a post extending upwardly from the center thereof, a pair of washers surrounding the post, one of said washers having a plurality of openings, one for each arm, each of said arms having a lug adapted to project into an opening, and means carried by the post for moving the washers and the inner ends of the posts upwardly and downwardly.

In testimony whereof I affix my signature.

JOSEPH H. JACOBS.